(12) United States Patent
Weyell et al.

(10) Patent No.: US 7,642,337 B2
(45) Date of Patent: Jan. 5, 2010

(54) METHOD AND DEVICE FOR CRYSTALLISING PLASTIC GRANULES WITH A TENDENCY TO CONGLUTINATE, PARTICULARLY PET AND PU GRANULES

(75) Inventors: Manfred Weyell, Mühlheim am Main (DE); Johannes Maurer, Bruchköbel (DE)

(73) Assignee: Vibra Maschinenfabrik Schultheis GmbH & Co., Offenbach (DE)

( * ) Notice: Subject to any disclaimer, the term of this patent is extended or adjusted under 35 U.S.C. 154(b) by 0 days.

(21) Appl. No.: 12/048,213

(22) Filed: Mar. 13, 2008

(65) Prior Publication Data

US 2008/0171847 A1 Jul. 17, 2008

Related U.S. Application Data

(63) Continuation of application No. PCT/EP2006/065531, filed on Aug. 21, 2006.

(30) Foreign Application Priority Data

Aug. 29, 2005 (DE) .................. 10 2005 040 851

(51) Int. Cl.
*C08F 6/00* (2006.01)
*C08J 3/00* (2006.01)

(52) U.S. Cl. .................. 528/502; 264/176.1; 264/219; 422/245.1; 528/271; 528/272

(58) Field of Classification Search .............. 422/245.1; 528/271, 272, 502 R; 264/176.1, 219
See application file for complete search history.

(56) References Cited

U.S. PATENT DOCUMENTS

| 2,235,324 | A | 3/1941 | Moreland |
| 4,356,911 | A | 11/1982 | Brown |
| 6,991,091 | B2 | 1/2006 | Thomson et al. |
| 2004/0010934 | A1 | 1/2004 | Geissbuhler et al. |
| 2005/0085620 | A1 | 4/2005 | Bruckmann |
| 2007/0073037 | A1* | 3/2007 | Otto et al. .................. 528/480 |

FOREIGN PATENT DOCUMENTS

| DE | 639878 | 12/1936 |
| DE | 2118434 | 10/1972 |
| EP | 0348372 | 12/1989 |
| EP | 1281642 | 2/2003 |
| EP | 1531134 | 5/2005 |
| WO | 2005051623 | 6/2005 |

* cited by examiner

Primary Examiner—Terressa M Boykin
(74) Attorney, Agent, or Firm—Myers Wolin, LLC

(57) ABSTRACT

In a method for crystallising plastic granules with a tendency to conglutinate, in particular PET and PU granules, the granules are subjected to vibratory excitation in a vibrating trough (1) transversely to the direction of longitudinal extension of the vibrating trough (1), at around their reaction temperature. The flow of granules follows a spiral path through the trough, achieving a narrow dwell time spectrum and a homogenous temperature gradient for the granules. Conglutination is also reliably prevented.

24 Claims, 7 Drawing Sheets

METHOD AND DEVICE FOR CRYSTALLISING PLASTIC GRANULES WITH A TENDENCY TO CONGLUTINATE, PARTICULARLY PET AND PU GRANULES

CROSS-REFERENCE TO RELATED APPLICATIONS

This is a continuation of PCT/EP2006/065531, filed Aug. 21, 2006, which claims priority to German Application 10 2005 040851.6, filed Aug. 29, 2005, the contents of which are incorporated herein by reference.

FIELD OF THE INVENTION

This invention also concerns a method for crystallising plastic granules with a tendency to conglutinate. The invention also concerns a corresponding device.

BACKGROUND

Following the actual granulation process, some plastic granules are subjected to heat treatment to change the structure of the granules. For example, polyethylene terephthalate granules also referred to here by the abbreviation PET granules, from the granulation process, are initially obtained in an amorphous state. The amorphous granules are converted into an at least partially crystalline state in a subsequent stage of treatment, known as crystallisation. Pronounced orientation of the molecular chains occurs in this process. In practice, degrees of crystallisation of around 30 to 50% are achieved in the crystallisation of PET granules.

Temperature control plays an important role in crystallisation. Firstly, the amorphous granules must be brought to or kept at a suitable reaction temperature. Secondly, some granules, for example PET or PU granules, tend to conglutinate in the transitional phase. PET granules become sticky even below the reaction temperature required for crystallisation, which lies between approximately 80 and 170° Celsius. The granules must be agitated during crystallisation to prevent their agglomeration. Their tendency to conglutinate decreases as the degree of crystallisation increases.

Whilst the amorphous granules are subjected to a crystallisation stage at temperatures below 80° Celsius in conventional granulation processes while being heated and powerfully agitated, it has recently been proposed, in connection with underwater granulation methods, that hot, pre-dried granules be exposed to vibratory excitation during an immediately subsequent crystallisation process. The vibratory excitation prevents conglutination of the plastic granules. The process heat stored in the granule particles may be exploited simultaneously for crystallisation, so that no additional heat is required in underwater granulation methods. In contrast, granules which have, for example, been stored in a silo in the interim, must first be cooled to avoid conglutination and subsequently be reheated for crystallisation.

In WO 2005/044901, a method is described for the thermal retreatment of PET granules in which the amorphous granules are fed through a vibrating trough for crystallisation. Said trough is divided into multiple consecutive chambers by intermediate walls in the form of weirs. The trough is vibrated in its direction of longitudinal extension by vibration motors. In this way the granules are conveyed along the trough by the vibratory excitation. The intermediate walls dam the flow of granules, causing longitudinal turbulence. At some point the individual granules spill over the intermediate weir walls and reach the granule outlet. The vibrating trough consequently has the same effect as a series of agitation vessels. Although this can prevent conglutination of the individual granules and achieve crystallisation, this configuration has the disadvantage of a relatively broad granule dwell time spectrum.

The use of a vibratory conveying device for crystallisation of PET granules is also known from DE 10 2004 050 356 A1. Vibration is excited in the direction of conveying in this case too. Compared to WO 2005/044901, the granules have a relatively short dwell time of 20 to 90 seconds in the vibratory conveyor device. Although a better dwell time spectrum can be achieved here, the path followed by the individual granules is relatively short, restricting their potential for interaction with other granules. This is unfavourable for equalising the temperature between the granules. Granules which predominantly traverse the trough on the surface of the flow of granules experience a different temperature gradient to those closer to the floor.

Achievement of a good dwell time spectrum is the intention of a vertical shaft reactor, as disclosed in DE 100 49 263 A1. However, no vibratory excitation is provided in this case.

SUMMARY

Against this background, the invention is based upon the problem of improving a method of the type described above in respect of a narrow dwell time spectrum and a homogenous temperature gradient, and of specifying a corresponding device.

This problem is solved by a method of crystallising plastic granules having a tendency to conglutinate, in particular PET and PU granules, in accordance with patent claim 1, in which the granules are subjected to vibratory excitation in a vibrating trough transversely to the direction of longitudinal extension of the trough, at around their reaction temperature. The above problem is also solved by a crystallisation device suitable for this purpose, in accordance with claim 15.

Transverse vibratory excitation makes the granules at the internal wall of the vibrating trough move upwards and slip back into the trough over the following rising granules when they reach more vertical sections of wall. This creates an uninterrupted, continuous flow of particles with high reciprocal interaction, enabling them to exchange process heat with each other. Not only is a very narrow dwell time spectrum of the granules in the crystallisation stage achieved in this way, but also a simultaneously highly homogenous temperature gradient, which has an advantageous effect on product quality.

Vibratory excitation transverse to the direction of longitudinal extension of the trough contains a direction component perpendicular to a plane extended by the direction of longitudinal extension of the trough and the direction of gravity. Directional or circular vibration is thus excited, which has at least one horizontal component in the cross-sectional plane perpendicular to the direction of longitudinal extension of the trough. This facilitates a spiral movement of the granules in the trough.

In accordance with an advantageous embodiment of the invention, the rate of advance of the granules through the vibrating trough from a granule inlet in one end section of the vibrating trough to a granule outlet in the opposite end section of the vibrating trough is mainly achieved by the introduction of granules at the granule inlet. The primary purpose of the vibration exciter is to generate a transverse movement component, making the flow of granules in the trough complete a spiral movement.

However, a slight restriction of the vibration generator or generators can also generate a component along the vibrating trough, to intensify the flow of product or to slow it down or reverse it by an effect in the opposite direction.

In a further advantageous embodiment of the invention, the effective direction of the vibration exciter or exciters is adjustable. For example, the dwell time in the vibrating trough can be changed very easily during operation by increasing or reducing the propulsion components along the vibrating trough or against the direction of product feed, by means of a suitable actuation system. Moreover, adjustment facilitates rapid emptying.

Alternatively, a vibration exciter may be provided which is aligned in the direction of longitudinal extension of the vibrating trough. Vibrations can be excited which have both transverse and longitudinal components by suitable location, deflection and/or adjustment of such a vibration exciter.

The inventive method preferably uses a continuous feed of pre-dried granules from an underwater granulation process.

However, it is also possible to introduce granules from an extrusion granulation process. However, the introduction of additional heat may be necessary in this case, to bring the granules to reaction temperature.

Heat may be introduced, for example, by means of process air. In the case of crystallisation of PET granules, it has proved particularly advantageous for the process air to be blown into or on to the granules located in the vibrating trough, from nozzles from above.

Alternatively or additionally, however, it is also possible to blow the air in through one or more perforated pipes located in the flow of granules.

A further possibility is the blowing in of process air through apertures in the wall of the vibrating trough. Such apertures are preferably located in the floor area, but may also extend into more vertical wall sections.

It is also possible to introduce heat by radiation or contact transfer. For this purpose, radiators may be located above the vibrating trough or heating elements may be located in the flow of granules.

There is also a possibility of removing heat specifically by means of the process air or other cooling devices.

The patent claims contain other advantageous embodiments of the invention.

BRIEF DESCRIPTION OF THE DRAWINGS

The invention is explained in more detail, below, using the specimen embodiments shown in the drawing.

DETAILED DESCRIPTION

Figure 1:
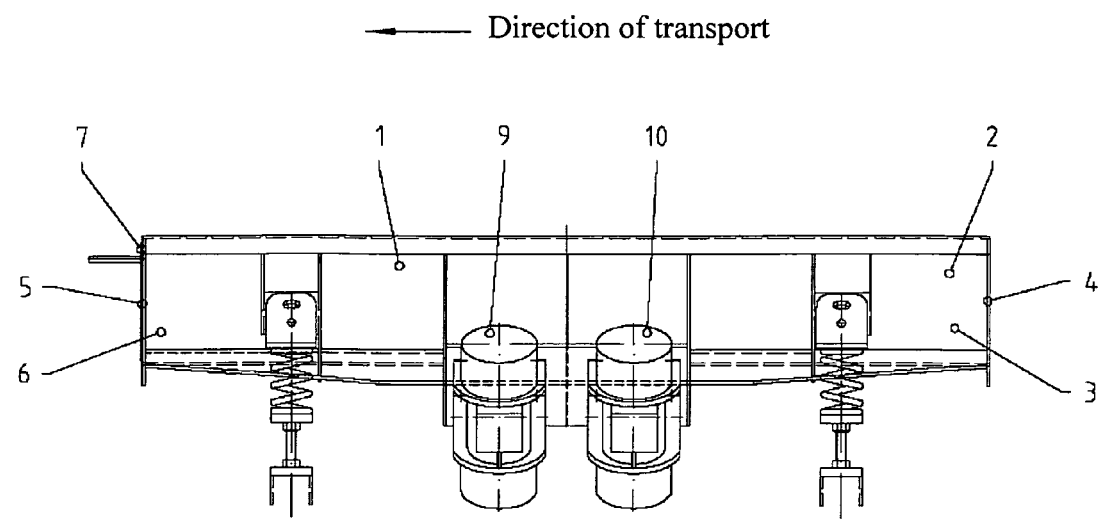
FIG. 1 is a side elevation of a initial specimen embodiment of a device for crystallising plastic granules with a tendency to conglutinate.
Figure 2:
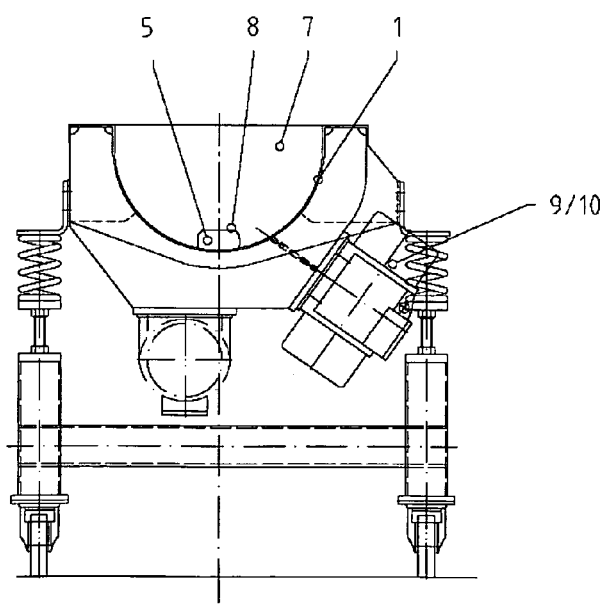
FIG. 2 is a cross-section of the device in FIG. 1 transverse to its direction of longitudinal extension.

The first specimen embodiment in FIGS. 1 and 2 is a device for crystallising plastic granules with a tendency to conglutinate which are subjected to thermal retreatment at an increased temperature. This includes polymer granules such as polyester and polyurethane granules. Non-restrictive reference will be made to PET granules below, obtained, for example, from an underwater or extrusion granulation process in an initially amorphous form.

The PET granules are subjected to vibration excitation for crystallisation in a vibrating trough 1 on sprung bearings. FIG. 1 shows a corresponding device which is particularly suitable for granules which are already at reaction temperature on their introduction into vibrating trough 1, rendering the introduction of additional heat unnecessary.

The dehydrated, pre-dried granules enter the mainly horizontal vibrating trough 1 through a granule inlet 2. The corresponding end section 3 of the vibration trough 1 is sealed off in the direction of longitudinal extension of vibration trough 1 by an end wall 4. An appropriate aperture or filling nozzle to introduce granules may be provided in the end wall 4, if necessary. The crystallised granules are removed at a granule outlet 5 in the opposite end section 6 of the vibrating trough 1. An end wall 7 sealing off the cross-section is fitted with a suitable outlet aperture 8, which may be closed by a shutter if necessary.

The vibrating trough 1 has an unobstructed cross-section in its direction of longitudinal extension between the granule inlet 2 and the granule outlet 5. In particular, it is free of overflow walls, weirs, etc, thus forming a mainly identical, homogenous thoroughfare for all the granules through the vibrating trough. The cross-section of the vibrating trough 1 is preferably constant throughout its entire length between the granule inlet 2 and the granule outlet 5. An unobstructed cross section of vibrating trough 1 which is continuous and free of interruptions from a granule inlet to the granule outlet 5 is thus formed.

Figure 11:
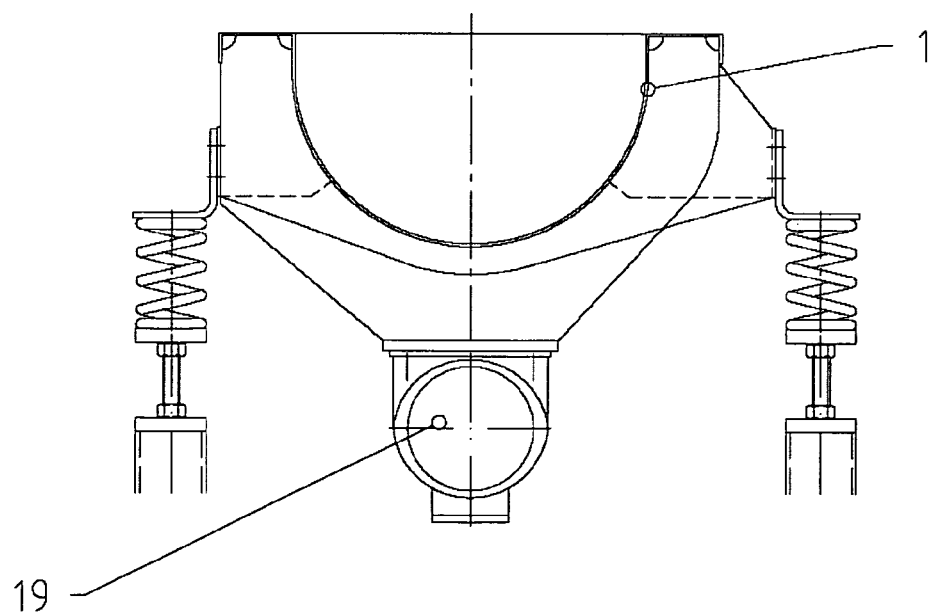
FIG. 11 is a side elevation to demonstrate an alternative arrangement of a vibration exciter.

Vibration of the vibrating trough 1 is excited transversely to the direction of longitudinal extension, to prevent conglutination of the granules and particularly to achieve as even a temperature gradient as possible. As an example, FIG. 1 shows two three-phase vibration motors 9 and 10, mounted on the sides of the vibrating trough 1 and the effective direction of which extends transversely to vibrating trough 1. As an alternative, a single vibration exciter may be mounted on the vibrating trough 1 instead of the three-phase vibration motors 9 and 10, as indicated by the broken line in FIG. 2, which generates transverse vibration of the vibrating trough 1 by suitable means. A configuration with a vibration exciter 19 located in the direction of longitudinal extension below the trough 1 is shown in FIG. 11, as an example.

In conjunction with the aforementioned vibration excitation, a cross-section identical or similar to that shown in FIG.

2 has the effect that granules close to the wall of the vibrating trough 1 are brought into a more vertical area to slip back on to following granules, bringing about circulation in the transverse direction.

In the first example of embodiment shown, the excitation of vibration is not used to convey the granules to the granule outlet 5. On the contrary, the rate of advance of the flow of granules is achieved solely by feeding granules through the granule inlet 2. In conjunction with the excitation of vibration in a transverse direction, the flow of granules from the granule inlet 2 to the granule outlet 5 completes an uninterrupted spiral movement which facilitates high interaction of the granules with a homogenous temperature gradient and a narrow dwell time spectrum.

Numerous modifications of this first specimen embodiment are possible, which are to be explained below, using further specimen embodiments and configurations.

Figure 3:
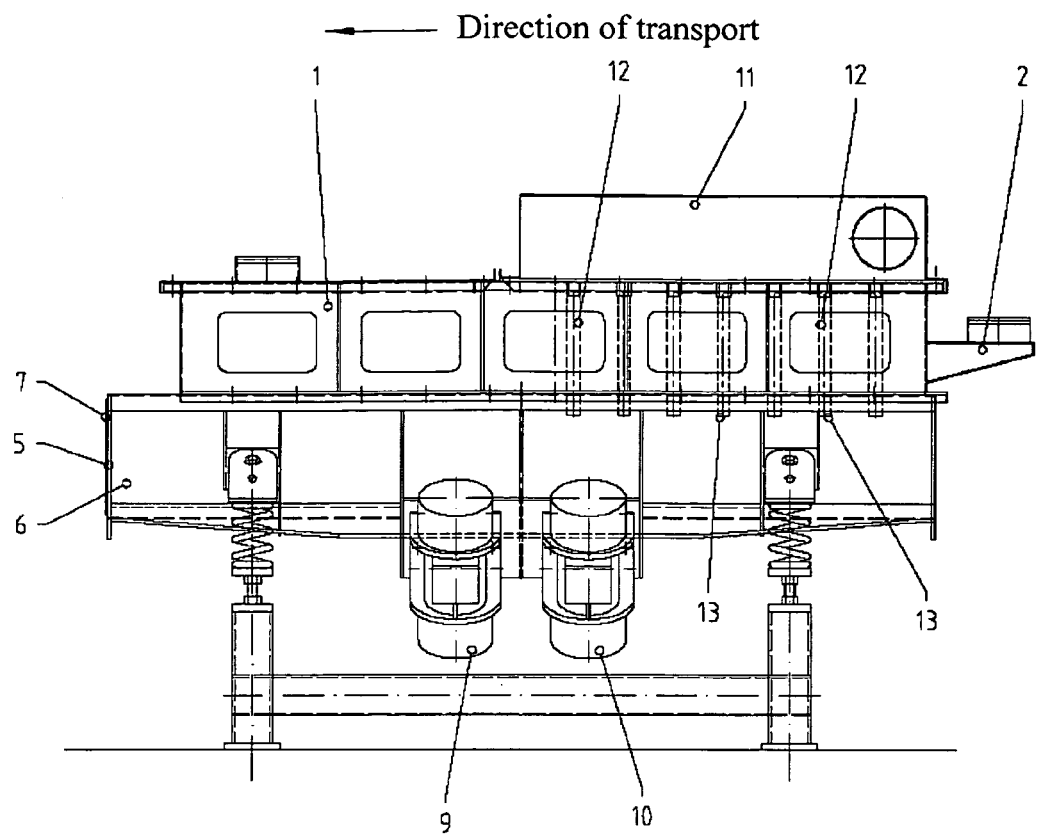
FIG. 3 is a side elevation of a second specimen embodiment of a device for crystallising plastic granules with a tendency to conglutinate.
Figure 4:
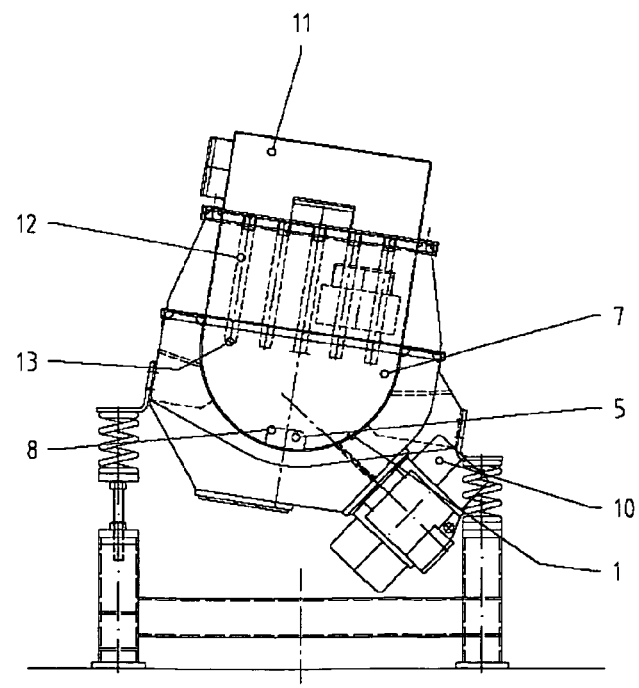
FIG. 4 is a cross-section of the device in FIG. 3 transverse to its direction of longitudinal extension.

FIGS. 3 and 4 show a device in which the vibrating trough 1 and vibration exciters 9 and 10 are configured in the same way as in the first example of embodiment. A heat introduction facility is also provided in this case, which makes the transfer of the amorphous granules from a granulation process less complicated in respect of the retention of process heat. Moreover, cold granules can be heated to the requisite reaction temperature without a risk of conglutination.

A facility 11 for providing process air is provided above the vibrating trough 1 in the second example of embodiment. It includes inter alia a number of nozzles 12, which extend into the vibrating trough 1 from above. However, process air can also be provided through only one or a few nozzles. The outlets 13 of the nozzle or nozzles 12 may be located directly above the flow of granules. However, it is also possible for the nozzles 12 and their outlets 13 to protrude into the flow of granules. The temperature of the air introduced can be adapted to meet the respective requirements. The nozzles 12 should preferably be located in the immediate vicinity of the granule inlet 2. It has been demonstrated that very good results are obtained with an air feed into the flow of granules from above, particularly in the case of PET granules.

Figure 5:
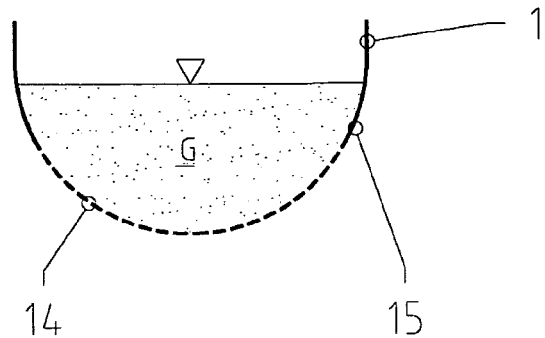
FIG. 5 is a cross-section of a modified embodiment of a vibrating trough with a modified process air inlet.

However, the introduction of process air may also take place from below, as shown in FIG. 5 using a further configuration of the vibrating trough 1'. For this purpose, a number of apertures 14 are formed, particularly in the floor area 15 of the vibrating trough 1' within the flow of granules G, supplied from a source of process air not shown in more detail.

Figure 6:
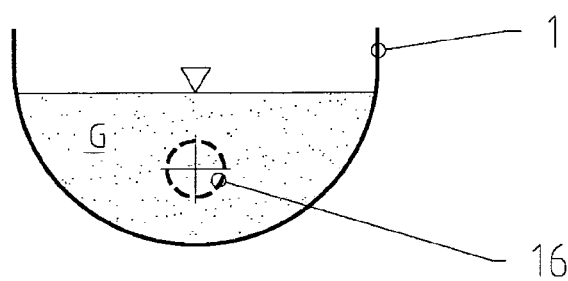
FIG. 6 is a section through a second modification of the vibrating trough.

FIG. 6 shows a further embodiment, in which a perforated pipe 16 is located in the flow of granules G. The perforated pipe 16 extends longitudinally, mainly in the centre of the vibrating trough 1. Process air may be blown in through the apertures in the pipe 16. For the purposes hereof, process air means any gaseous medium suitable for transferring heat to the granules. Moreover, it is conceivable for process air to add catalysts or additives to the granules. Furthermore, process air may also be used for cooling purposes.

Figure 7:
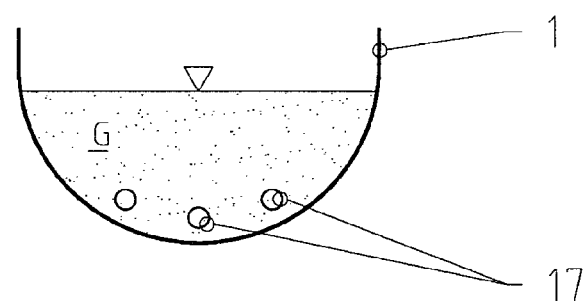
FIG. 7 is a section through a third modification of the vibrating trough.
Figure 7A:
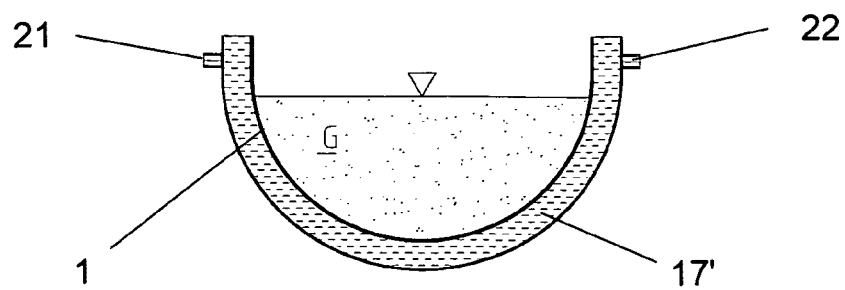
FIG. 7a shows a modification of the heat transfer system in accordance with FIG. 7.

FIG. 7 shows a further embodiment of the vibrating trough 1, in which heating elements 17 are located in the flow of granules G for introducing heat by contact transfer. Said heating elements 17 may, for example, take the form of heat carrier tubes. However, electric heating elements are also conceivable. In a further modification, the wall of the vibrating trough 1' may be configured as a heating system 17', as shown in FIG. 7a. A working medium circulates through the wall, entering the wall e.g. through 21 and leaving it through 22.

The different heat introduction methods may also be combined with each other.

If necessary, the process air or working medium may be used for cooling instead of introducing heat, using the devices named.

Figure 8:
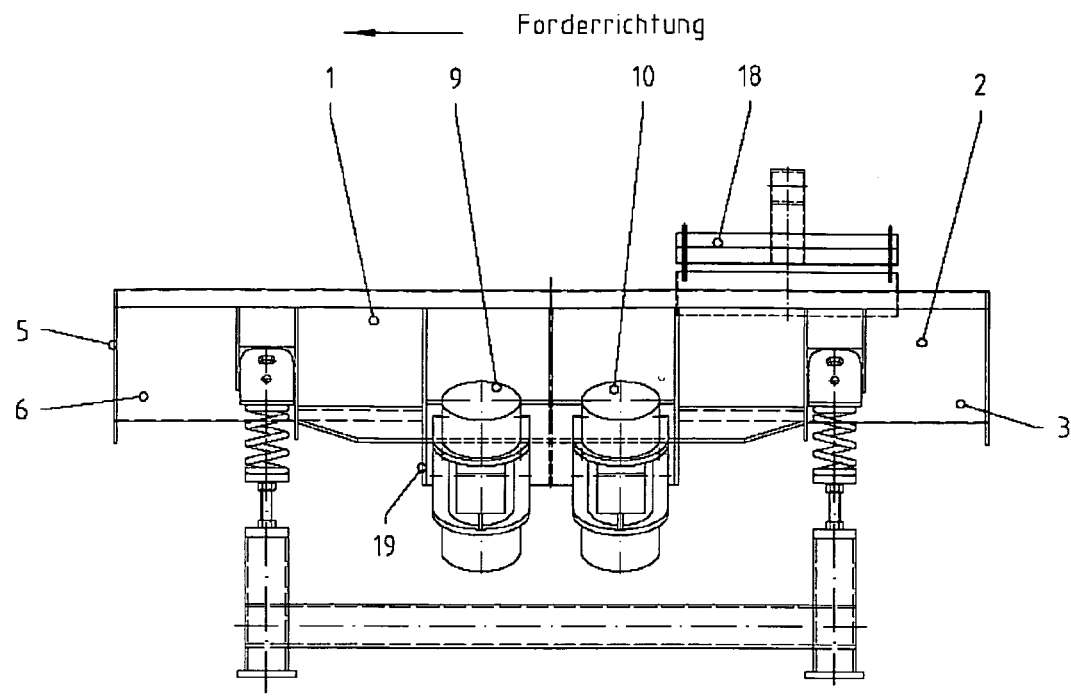
FIG. 8 is a side elevation of a third specimen embodiment of a device for crystallising plastic granules with a tendency to conglutinate.
Figure 9:
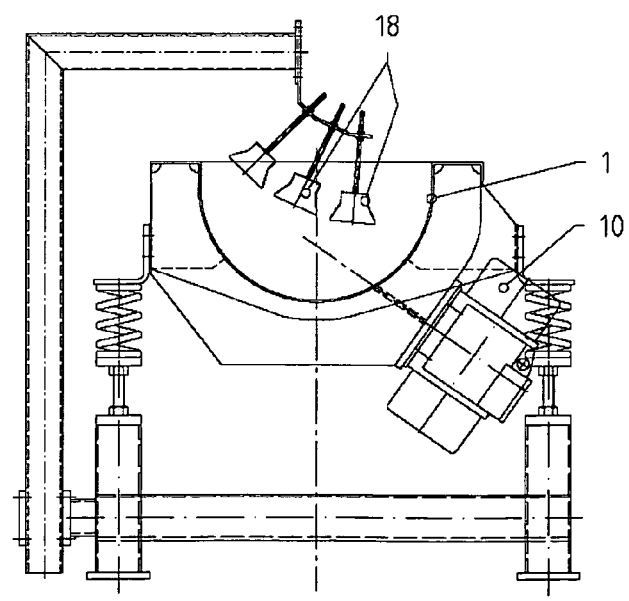
FIG. 9 is a section though the device in FIG. 8 transverse to its direction of longitudinal extension.

A third example of embodiment of a device for crystallising plastic granules with a tendency to conglutination is shown in FIGS. 8 and 9. In this case too, as in the first example of embodiment, a vibrating trough 1 with two vibration exciters 9 and 10 exciting vibration transversely to the direction of longitudinal extension is provided. Unlike the examples of embodiment explained hitherto, the introduction of heat into the granules takes place by radiation. For this purpose, several radiators 18 aligned with the surface of the flow of granules are provided in the vicinity of the granule inlet.

The lateral transverse vibration exciters 9 and 10 may be swiveled somewhat in the direction of advance to increase or reduce the feed-dependent rate of advance. This allows the dwell time of the granules in the trough to be influenced. If necessary, conveying may also take place up a gradient. Moreover, the transverse vibration exciters 9 and 10 may be additionally equipped with incremental encoders and inclined on to the effective axis by a suitable control system. This facilitates rapid, continuously adjustable modification of the feed components. The possibility of reversing the direction of feed also exists. Here too, a single, central vibration exciter 19 may be provided in any location instead of two lateral transverse vibration exciters 9 and 10. However, the transverse component remains dominant during crystallisation in all cases. The motive measures specified may be used in all the examples of embodiment and configurations described.

Figure 10:
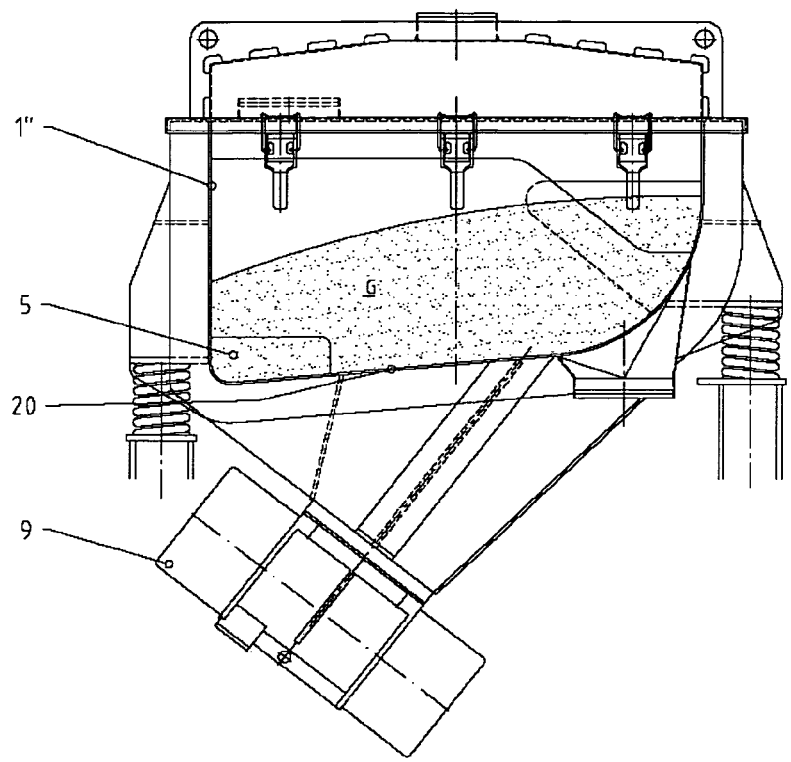
FIG. 10 is a side elevation of a further vibrating trough with an asymmetrical cross-section.

FIG. 10 shows an example for the modification of the cross-section of vibrating trough 1", which need not necessarily be in the form of an arc. On the contrary, the cross-section may take the form of a floor 20 which is predominantly flat in the effective direction of the transverse vibration exciter 9. Alternatively, this floor 20 may rise, fall or be horizontal in the effective direction.

Figure 12:
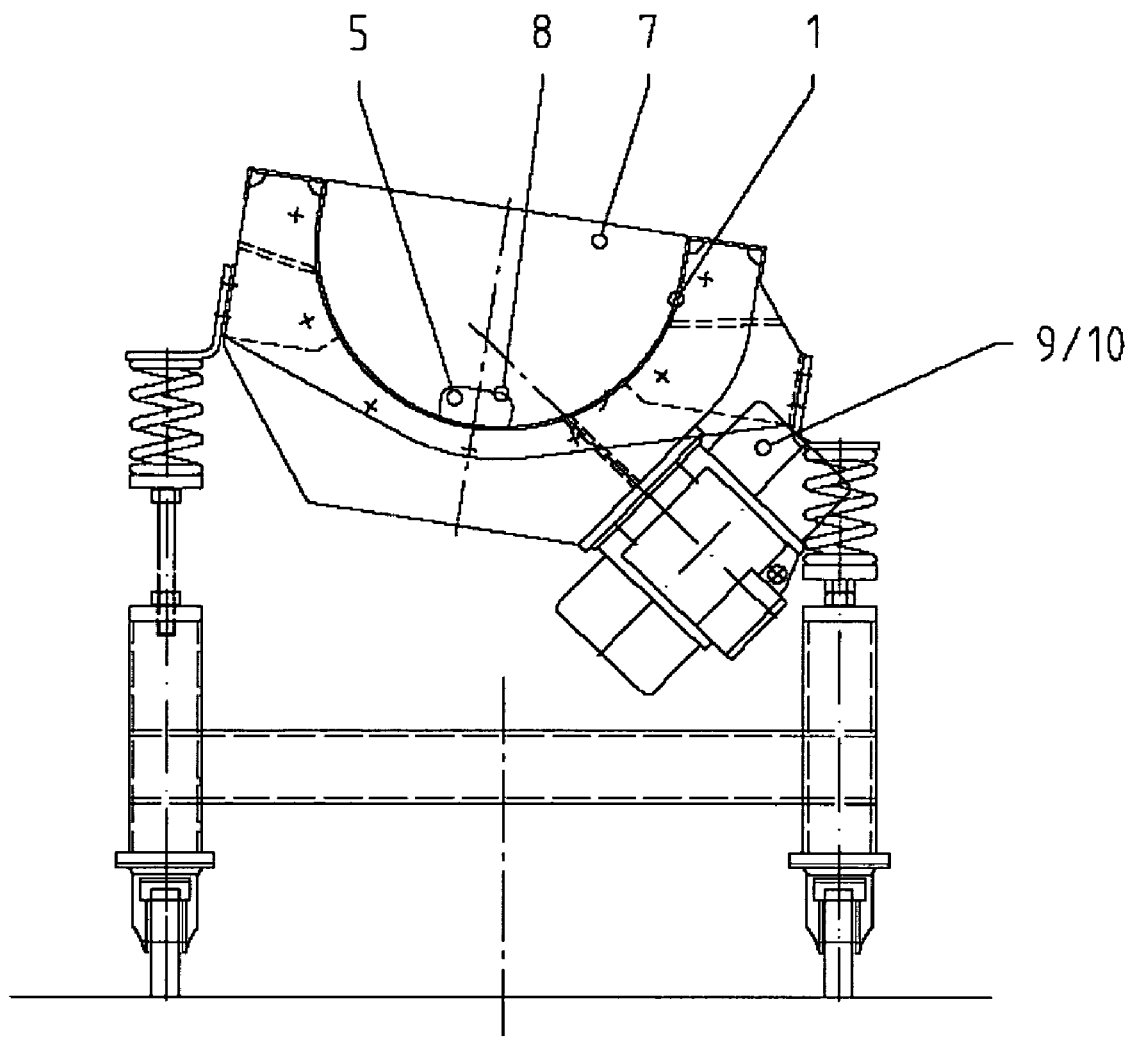
FIG. 12 is a side elevation to demonstrate a lateral inclination of the vibrating trough.

FIG. 12 also shows the possibility of inclining the vibrating trough 1 laterally, so that the area of the wall against which the granules rise is higher than the opposite area of the wall.

Figure 13:
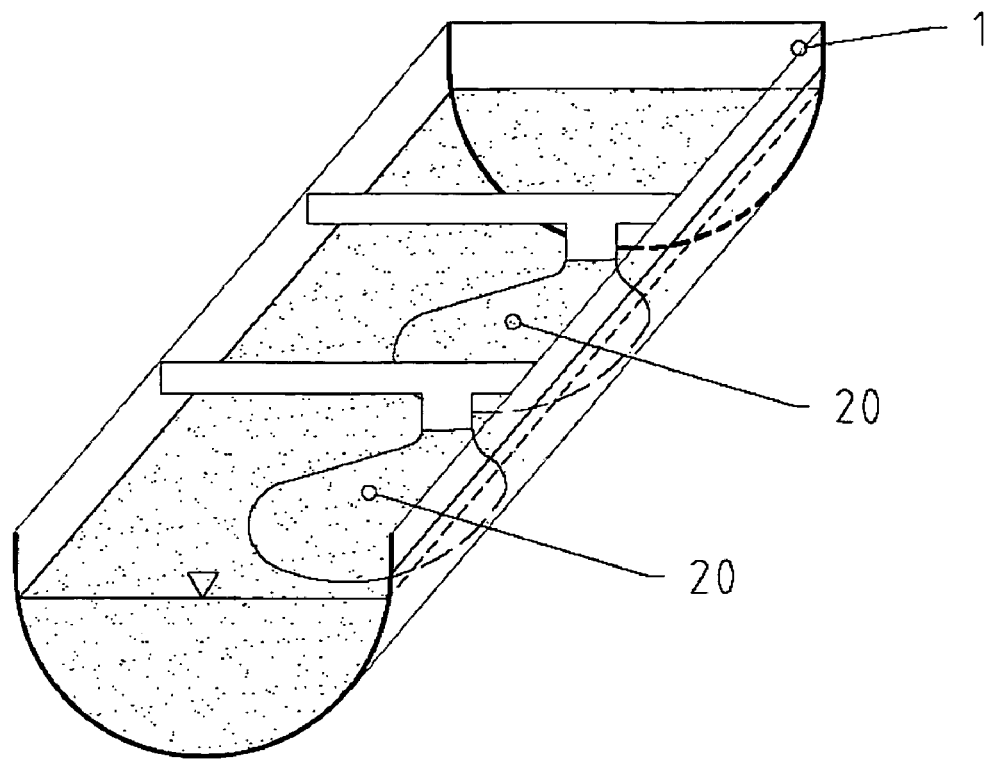
FIG. 13 shows a fourth specimen embodiment of a vibrating trough with guide vanes.
Figure 14:
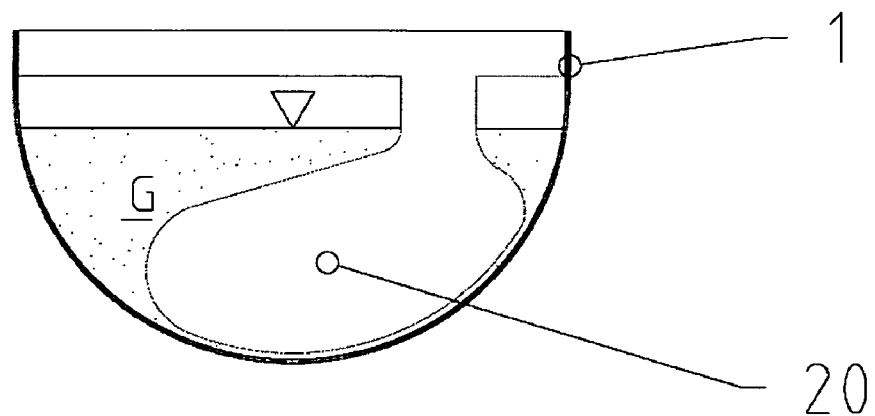
FIG. 14 is a cross-section of the trough in FIG. 13 at a guide vane.

Guide vanes 20 are installed in the vibrating trough 1 in the embodiment shown in FIGS. 13 and 14. They do not restrict the continuous feed of granules and thus do not constitute barriers or weirs. On the contrary, they are arranged to encourage as consistent as possible a flow of granules on a spiral path through the vibrating trough 1. The guide vanes 20 may be configured leaving a gap between them and the floor of the vibrating trough 1, to facilitate emptying the trough without leaving any residue. Moreover, the guide vanes 20 may also be slightly staggered in relation to the cross-section of the vibrating trough 1 when installed, which can generate an additional mixing component.

The invention has been explained in more detail above using examples of embodiments. However, it is not restricted to said examples of embodiments, but includes all the devices and methods specified by the patent claims.

We claim:

1. A method for crystallizing plastic granules having a tendency to conglutinate at around their reaction temperature for crystallization, in particular polyethylene terephthalate and polyurethane granules, comprising vibrating the plastic granules at around their reaction temperature for crystallization in a vibrating trough having a longitudinal extension, vibrating having a transverse component perpendicular to a plane formed by the direction of longitudinal extension of the vibrating trough and the direction of gravity for spirally moving the plastic granules in the vibrating trough in the direction of longitudinal extension of the vibrating trough.

2. The method in accordance with claim 1, wherein the granules traverse the vibrating trough free of weirs in the direction of longitudinal extension between a granule inlet and a granule outlet.

3. The method in accordance with claim 1, wherein the granules traverse the vibrating trough with a continuous, uninterrupted cross-section from a granule inlet to a granule outlet.

4. The method in accordance with claim 1, further comprising guiding the flow of granules in the vibrating trough with at least one guide vane.

5. The method in accordance with claim 1, wherein the rate of advance of the granules through the vibrating trough from a granule inlet in one end section of the vibrating trough to a granule outlet in an opposite end section of the vibrating trough is influenced by feeding granules through the granule inlet.

6. The method in accordance with claim 1, further comprising continuously feeding pre-dried granules from an underwater granulation process into the vibrating trough.

7. The method in accordance with claim 1, further comprising feeding granules from an extrusion granulation process into the vibrating trough and introducing additional heat and/or cooling into the vibrating trough.

8. The method in accordance with claim 7, wherein the introduction of heat and/or cooling takes place by blowing process air, into or onto the granules in the vibrating trough through at least one nozzle from above the vibrating trough.

9. The method in accordance with claim 7, wherein the introduction of heat and/or cooling take place by blowing process air, through one or more perforated pipes located in the flow of granules in the vibrating trough.

10. The method in accordance with claim 1, wherein heat is introduced and/or cooling takes place by blowing process air through apertures in a floor and/or a sidewall, of the vibrating trough.

11. The method in accordance with claim 1, wherein heat is introduced into the vibrating trough by radiation.

12. The method in accordance with claim 1, further comprising introducing heat and/or cooling in the vibrating trough by contact transfer with heating and cooling elements.

13. A device for crystallising plastic granules with a tendency to conglutinate, particularly polyethylene terephthalate and polyurethane granules, comprising:

a vibrating trough for accepting granules at around their reaction temperature for crystallization, the vibrating trough having a longitudinal extension, and:

at least one vibration exciter mounted on the vibrating trough that is configured so that its vibratory excitation has a transverse component perpendicular to a plane formed by the direction of longitudinal extension of the vibrating trough and the direction of gravity for spirally moving plastic granules in the vibrating trough in the direction of longitudinal extension of the vibrating trough.

14. The device in accordance with claim 13, wherein the vibrating trough has an uninterrupted, constant cross-section in the direction of longitudinal extension between a granule inlet and a granule outlet.

15. The device in accordance with claim 13, further comprising at least one guide vane for guiding the flow of granules provided in the vibrating trough.

16. The device in accordance with claim 13, further comprising at least one nozzle extending in the direction of the vibrating trough for blowing in process air from above the vibrating trough.

17. The device in accordance with claim 13, further comprising a perforated pipe located in the vibrating trough for blowing in process air.

18. The device in accordance with claim 13, further comprising apertures provided in a floor and/or sidewall of the vibrating trough (1') for blowing in process air.

19. The device in accordance with claim 13, further comprising radiators located above the vibrating trough.

20. The device in accordance with claim 13, further comprising at least one heating and/or cooling element located in the vibrating trough for introducing and/or evacuating heat by contact transfer.

21. The device in accordance with claim 13, further comprising a floor area of the vibrating trough that is heated and/or cooled.

22. The device in accordance with claim 13, wherein the at least one vibration exciter generates vibration having a component in the direction of longitudinal extension of the vibrating trough that is smaller than the transverse component.

23. The device in accordance with claim 13, wherein the effective direction of the vibration exciters is adjustable.

24. The device in accordance with claim 13, further comprising a control system for actuating the at least one vibration exciter to incline an axis of the at least one vibration exciter in the direction of longitudinal extension of the vibrating trough for modifying a component of the rate of advance of plastic granules in the vibrating trough in the direction of longitudinal extension of the vibrating trough.

* * * * *